United States Patent [19]
Long et al.

[11] Patent Number: 6,078,864
[45] Date of Patent: Jun. 20, 2000

[54] NAVIGATION SYSTEM WITH PREDETERMINED INDICATION OF NEXT MANEUVER

[75] Inventors: Donald Joe Long, Sterling Heights; Jeffrey Alan Millington, Rochester Hills, both of Mich.

[73] Assignee: Magellan DIS, Inc., Rochester Hills, Mich.

[21] Appl. No.: 09/118,030

[22] Filed: Jul. 17, 1998

Related U.S. Application Data

[60] Provisional application No. 60/084,222, May 5, 1998.

[51] Int. Cl.[7] .................................................. G06F 165/00
[52] U.S. Cl. ........................... 701/209; 701/201; 701/211; 340/995
[58] Field of Search .................................... 701/201, 202, 701/208, 209, 210, 211; 340/990, 995

[56] References Cited

U.S. PATENT DOCUMENTS 5,565,874 10/1996 Rode ........................................ 342/457
5,951,621 9/1999 Palalau et al. .......................... 701/200

*Primary Examiner*—Tan Nguyen
*Attorney, Agent, or Firm*—Howard & Howard

[57] ABSTRACT

A navigation system is used to assist a user in proceeding from a current location to a desired destination. The navigation system includes an input device for selecting a desired destination from a database of roads. The input device can also be used to specify a vehicle type, such as a truck, car, or bus, for example. The navigation system also includes a processor for determining a route from a current vehicle position to the desired destination in the database, where the route includes a plurality of maneuvers. An output device indicates a maneuver instruction to a driver at an interval before an upcoming maneuver along the route. The interval is determined based upon vehicle type such that the maneuver instruction will be communicated to the driver sooner for a larger vehicle than for a smaller vehicle. This allows the driver to have an adequate amount of time to position the vehicle to perform the upcoming maneuver.

21 Claims, 1 Drawing Sheet

NAVIGATION SYSTEM WITH PREDETERMINED INDICATION OF NEXT MANEUVER

This application claims priority to U.S. Provisional Application Ser. No. 60/084,222 filed on May 5, 1998.

BACKGROUND OF THE INVENTION

This present invention relates to vehicle navigation or route guidance systems and more particularly to a navigation system that indicates an upcoming maneuver at a predetermined interval from the upcoming maneuver.

Navigation systems generally provide a recommended route from a starting point to a desired location. Generally, the starting point and desired location are selected from a large database of roads stored in a mass media storage, such as a CD ROM, which includes the roads in the area to be traveled by the user. The navigation system can be located in a personal computer or it can be installed in a vehicle. If the navigation system is installed in a vehicle, the starting point is typically the current position of the vehicle, which can be entered into the navigation system by an associated position determining system that usually includes a Global Positioning System (GPS) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain predetermined criteria including the length of the route and the estimated time of travel on the route. Depending upon the predetermined algorithm of the navigation system, the navigation system will recommend the route with the shortest total length, the lowest total time, or some weighted average of length and time.

The recommended route is then displayed to the user as a map showing the starting point, desired destination and highlighting the recommended route. Preferably, if the navigation system is installed in a vehicle, the navigation system displays the current location of the vehicle and provides turn-by-turn instructions to the driver, guiding the driver to the selected destination along the recommended route. The indication of the upcoming maneuver may be indicated audibly, such as with a voice description of the upcoming maneuver, or displayed visibly, or both.

It may be necessary for the vehicle to change lanes prior to the maneuver because the maneuver could include exiting a highway, entering a highway, or making a turn at an intersection. Therefore, the upcoming maneuver is indicated to the driver at a distance before the maneuver so that proper vehicle positioning can be accomplished. Depending upon the type of vehicle in which the navigation system is installed, this distance may be inadequate or too long. For example, larger vehicles, such as buses, will require more time to achieve a proper position to perform the upcoming maneuver than a small car would.

This problem is further complicated by the desirability to create navigation systems which can be easily moved from one vehicle to another, because drivers typically own more than one type of vehicle. For example, a driver may own a small vehicle for commuting to and from the workplace and the driver may also own a large motor home for vacationing or a truck that has the capability of pulling a trailer. The motor home and the truck with a trailer will require additional time and distance to be in the proper position to make the upcoming maneuver as compared to the time and distance needed by the small vehicle or the truck without the trailer.

Accordingly, it is desirable to provide a navigation system that indicates an upcoming maneuver at a predetermined distance from the upcoming maneuver based on vehicle type. It is also desirable to provide a navigation system that is simple for a driver to adjust to navigate for a different vehicle type so that the navigation system can be easily moved from one vehicle to another.

SUMMARY OF THE INVENTION

In general terms, this invention provides a vehicle location display for a navigation system where a user can select a destination and the system provides a route and instructions to proceed to the destination. The navigation system includes a database of roads and a system for determining the current position of the vehicle in relation to the database. The vehicle location display shows the current vehicle location on a display device in a graphical display mode. The display displays a map having the current location of the vehicle in reference to roads in the database. A user can select a desired destination in the database by using an input device connected to the navigation system. The navigation system also includes a system for determining a route to the destination. The route is comprised of a plurality of maneuvers to be performed by the vehicle in order to proceed from the vehicle's current position to the desired destination. An output device indicates a maneuver instruction to a driver at an interval before an upcoming maneuver along the route. This interval is determined based upon vehicle type to allow the driver to have time to position the vehicle to perform the upcoming maneuver.

These and other features and advantages of the present invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
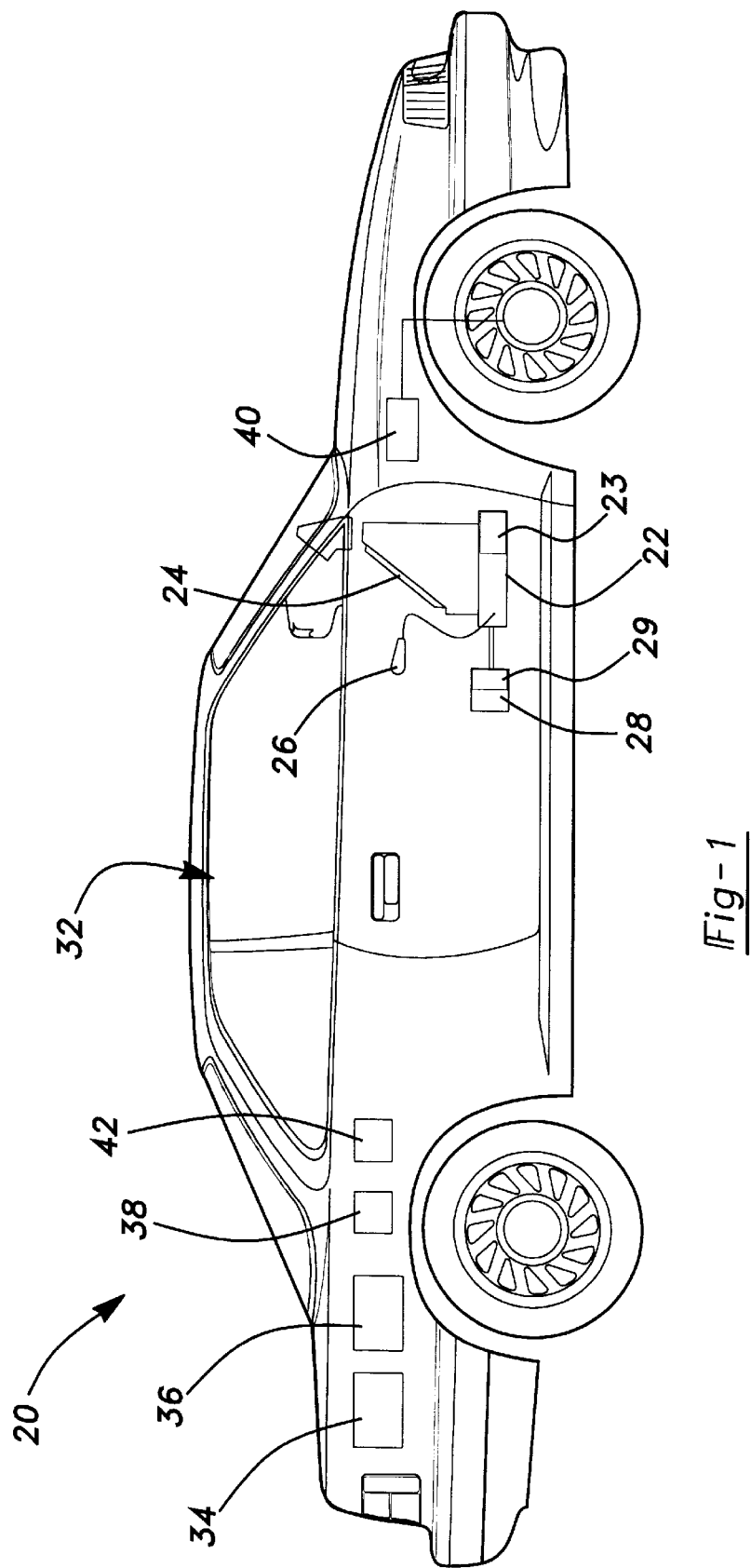
FIG. 1 is a schematic of the navigation system of the present invention.

The navigation system 20 of the present invention is shown schematically in FIG. 1. The navigation system 20 includes a central processor unit (CPU) 22 connected to a display or other output device 24, such as a high resolution LCD or flat panel display. The CPU 22 is also connected to an input device 26 such as a mouse, keyboard, key pad, or remote device. Alternatively, the display 24 can be a touch screen display. The navigation system 20 further includes a storage device 28, such as a hard drive 28 or a CD ROM, connected to the CPU 22. The storage device 28 contains a database including a map of all roads in the area to be traveled by the vehicle 32 and may contain the software for the CPU 22, including the graphical user interface, route guidance, operating system, position-determining software, etc.

The navigation system preferably includes position and motion determining devices, such as a Global Positioning System (GPS) receiver 34, a gyroscope 36, a compass 38, a wheel speed sensor 40, and an orthogonal multiple axis accelerometer 42 all connected to the CPU (connections not shown for simplicity). Such position and motion determining devices are well known and are commercially available.

The navigation system 20 determines the position of the vehicle 32 relative to the database of roads utilizing the position and motion determining devices. The driver selects a destination relative to the database of roads utilizing the user input device 26 and the display 24. The navigation system 20 then determines a route comprised of a plurality of maneuvers from the vehicle's current position to the desired destination. The navigation system 20 displays this route on the display 24 and provides turn-by-turn instructions to the driver to guide the driver along the route to the desired destination from the present position.

As previously mentioned, the route is comprised of a plurality of maneuvers which are to be executed in order if the vehicle 32 is to arrive at the desired destination. As the vehicle 32 travels along the route, it may be necessary to change lanes prior to the next maneuver if the vehicle 32 is on a multi-lane road. For example, if the vehicle 32 is traveling along a highway and the next maneuver is to exit the highway, the vehicle may have to change lanes in order to be in the correct lane to exit the highway. Therefore, the navigation system 20 of the present invention provides a maneuver instruction to indicate the upcoming maneuver to the driver at a predetermined interval before the maneuver so that the driver has time to properly position the vehicle 32. This predetermined interval is determined based upon vehicle type because certain vehicles, such as buses, for example, require more time than other vehicles to be positioned properly to achieve the next maneuver.

In the present invention, the CPU 22 includes a database having a plurality of tables of vehicle dynamics, each associated with a vehicle type. Each table indicates to the CPU 22 for the specific vehicle type when to provide the indication of the next maneuver, based upon distance to the next maneuver, current vehicle speed, estimated time to arrive at the next maneuver, etc. Thus, the navigation system 20 has the capability to determine a first interval for a first vehicle type and a second interval for a second vehicle type where the intervals differ from each other when the vehicle types are different.

During operation, when the navigation system 20 is installed in the vehicle 32, the user indicates to the navigation system 20 the type of vehicle in which the navigation system 20 is currently installed, preferably using the user input device 26 and display 24. This is advantageous when the user owns more than one type of vehicle. The user can move the navigation system 20 amongst a plurality of vehicle types and use the input device 26 to select the appropriate vehicle type. Alternatively, the navigation system 20 can determine automatically the vehicle or vehicle type in which it is installed.

The navigation system 20 then utilizes the associated table for the selected vehicle type when guiding the driver to the desired destination. The current vehicle position, is determined by the sensors, such as GPS, accelerometers, as well as map matching software. Based upon the current vehicle position, the navigation system 20 further determines the interval based on the distance between the vehicle and the next maneuver. In the preferred embodiment, this distance and the current speed of the vehicle, as determined by the sensors, is used to index the table associated with the current vehicle type. The CPU 22 determines from the table when to indicate the next maneuver to the driver. An upcoming maneuver is then indicated audibly and/or visually to the driver at a distance which is determined to be safe for the given vehicle type.

An example of a table for a selected vehicle type is shown below.

| | Maneuver Table | |
|---|---|---|
| Rank/Speed Category | Urban Area Distance | Rural Area Distance |
| 0 | 100 meters | 120 meters |
| 1 | 120 meters | 150 meters |
| 2 | 150 meters | 180 meters |
| 3 | 500 meters | 700 meters |
| 4 | 600 meters | 800 meters |

This table is used as an example of a "car" vehicle type. It should be understood that the table shown is meant only to be an example of data for one vehicle type and that other data could be used. The distances shown represent the distance at which the next maneuver is indicated to the driver and is equivalent to the distance from the current vehicle position to the next maneuver.

The "Rank/Speed Category" is used to differentiate between various street types. For example, a Rank of "0" is used for a car that is on a subdivision or neighborhood street and a Rank of "4" is used for a car that is on a highway. The distances for highway type streets, such as a Rank of "3" or "4," are distances before Sign Text Information, i.e., are distances from the current vehicle position to a highway sign that indicates the desired exit or turn-off. For all "Rank/Speed" categories, the distance remaining to the maneuver, once the indication of the next maneuver has been given, is the actual distance traveled along the road, not a straight-line distance.

Preferably, there is also a differentiation made between rural and urban areas. Typically, the distance used to determine when an indication of the next maneuver should be made is longer for a rural area than an urban area. This is because urban areas usually have more streets that are crossed by the vehicle between maneuvers. An indication of the next maneuver should not be given too soon in an urban area because the driver may become confused and turn too early whereas the indication of the next maneuver can be given at a greater distance from the maneuver in a rural area because there are fewer cross streets.

A different table with different values would be used for a bus or RV vehicle type. For example, an RV table would have values approximately equal to the car distances multiplied by a factor of 1.5. Alternatively, the tables could be implemented as an equation or a combination of tables and equations could be used. For example, a base vehicle type table could be used with values for other vehicles determined based on a different equation for each different vehicle type.

Optionally, the navigation system 20 can further determine the interval based on the time of day. The navigation system 20 utilizes the GPS to determine the current time of day for the vehicle at its current position and then determines the interval based on the time of day and the vehicle type. Thus, during typical high traffic periods such as commuting hours to and from work (typically 7 a.m. to 9 a.m. or 4 p.m. to 6 p.m), the maneuver instruction will be provided to the driver sooner than it would for a low traffic time. This allows the driver to have more time to position the vehicle for the upcoming maneuver during heavy traffic.

The preferred method for indicating a maneuver instruction to a driver at an interval before a maneuver includes the steps of: (a) determining a position relative to a database of roads; (b) selecting a destination in the database; (c) determining a route to the destination in the database where the route includes a plurality of maneuvers; (d) indicating a maneuver instruction to a driver at an interval before each of the maneuvers along the route; and (e) determining the interval based upon vehicle type. Additional method steps are discussed in more detail below.

A vehicle type is selected from a database having a plurality of tables of vehicle dynamics prior to indicating the maneuver instruction. The navigation system 20 determines a first interval for this vehicle type based on data in these tables. If the navigation system 20 is moved from this first vehicle to a second vehicle type, the navigation system 20 determines a second interval for the second vehicle type based on data in the database of vehicle types. If the first vehicle type is different than the second vehicle type then the second interval, as determined by the navigation system 20, is different from the first interval.

Other steps include measuring the vehicle speed and further determining the interval based on vehicle speed in relation to the upcoming maneuver, or further determining the interval based upon a distance between the vehicle's current position and the upcoming maneuver.

The present invention is advantageous because it provides a navigation system 20 that indicates an upcoming maneuver at a predetermined interval from the upcoming maneuver based on vehicle type so that the driver has enough time to position the vehicle to successfully accomplish the upcoming maneuver. The system is also easily adjusted to accommodate different vehicle types so that it can be easily moved from one vehicle to another.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle navigation system comprising
   a database of roads to be traveled by a vehicle;
   a system for determining a position of the vehicle relative to the database;
   a system for determining a route to a destination in said database of roads;
   an output device for indicating a maneuver instruction to a driver at an interval before an upcoming maneuver along the route; and
   a system for determining said interval based upon vehicle type.

2. A vehicle navigation system of claim 1 including a database of vehicle types wherein said system determines a first interval for a first vehicle type and determines a second interval for a second vehicle type.

3. A vehicle navigation system of claim 2 wherein said first interval is different than said second interval when said first vehicle type is different than said second vehicle type.

4. A vehicle navigation system of claim 2 including a system for selecting a specific vehicle type.

5. A vehicle navigation system of claim 1 including a database of vehicle types, said database associating each of a plurality of vehicle types with different intervals.

6. A vehicle navigation system of claim 1 wherein said interval is further determined based upon vehicle speed.

7. A vehicle navigation system of claim 1 wherein said interval is further determined based upon a distance from a current vehicle position to said upcoming maneuver.

8. A vehicle navigation system of claim 1 wherein said interval is further determined based upon a time for the vehicle to travel from a current position to said upcoming maneuver.

9. A method for indicating a maneuver instruction to a driver at an interval before a maneuver including the steps of:
   (a) determining a position relative to a database of roads;
   (b) selecting a destination in the database;
   (c) determining a route to the destination in the database where the route includes a plurality of maneuvers;
   (d) indicating a maneuver instruction to a driver at an interval before each of the maneuvers along the route; and
   (e) determining the interval based upon vehicle type.

10. The method of claim 9 further including the step of
    (f) selecting a first vehicle type from a database of vehicle types prior to step (d).

11. The method of claim 10 further including the step of
    (g) determining a first interval for the first vehicle type based on data in the database of vehicle types during step (e).

12. The method of claim 11 further including the steps of
    (h) selecting a second vehicle type from the database of vehicle types; and
    (i) determining a second interval for the second vehicle type based on data in the database of vehicle types where the second interval is different from the first interval when the first vehicle type is different than the second vehicle type.

13. The method of claim 9 further including the steps of
    (f) measuring vehicle speed prior to step (e); and
    (g) further determining the interval based on vehicle speed during step (e).

14. The method of claim 9 further including the step of
    (f) further determining the interval based upon a distance between a current position relative to the database of roads and the maneuver during step (e).

15. A vehicle navigation system comprising:
    an input device for selecting a desired destination from a database of roads;
    a processor for determining a route from a current vehicle position to the desired destination in the database, said route including a plurality of maneuvers; and
    an output device for indicating a maneuver instruction to a driver at an interval before an upcoming maneuver along the route wherein said interval is determined based upon vehicle type.

16. A vehicle navigation system of claim 15 including a database of vehicle types, said interval determined based upon said database of vehicle types.

17. A vehicle navigation system of claim 16 wherein said input device selects from among said vehicle types.

18. A vehicle navigation system of claim 16 further including means for determining a first interval for a first vehicle type and determining a second interval for a second vehicle type.

19. A vehicle navigation system of claim 18 wherein said first interval is different than said second interval when said first vehicle type is different than said second vehicle type.

20. A navigation system of claim 15 wherein said output device visually displays said maneuver instruction on a display screen.

21. A navigation system of claim 15 wherein said output device includes an audible output for said maneuver instruction.

* * * * *